(12) United States Patent
Matsusue et al.

(10) Patent No.: US 12,435,211 B2
(45) Date of Patent: Oct. 7, 2025

(54) FIBROUS CELLULOSE COMPOSITE RESIN AND PRODUCTION METHOD THEREFOR, AND RESIN REINFORCING MATERIAL

(71) Applicant: Daio Paper Corporation, Ehime (JP)

(72) Inventors: Ikko Matsusue, Ehime (JP); Yu Ochiai, Ehime (JP)

(73) Assignee: Daio Paper Corporation, Ehime (JP)

( * ) Notice: Subject to any disclaimer, the term of this patent is extended or adjusted under 35 U.S.C. 154(b) by 556 days.

(21) Appl. No.: 17/434,108

(22) PCT Filed: Mar. 12, 2020

(86) PCT No.: PCT/JP2020/010872
§ 371 (c)(1),
(2) Date: Aug. 26, 2021

(87) PCT Pub. No.: WO2020/203147
PCT Pub. Date: Oct. 8, 2020

(65) Prior Publication Data
US 2022/0135781 A1     May 5, 2022

(30) Foreign Application Priority Data
Mar. 29, 2019  (JP) ................................. 2019-065313

(51) Int. Cl.
*C08L 23/12* (2006.01)
*C08J 3/00* (2006.01)
*C08J 5/06* (2006.01)

(52) U.S. Cl.
CPC ............... *C08L 23/12* (2013.01); *C08J 3/005* (2013.01); *C08J 5/06* (2013.01); *C08J 2323/12* (2013.01); *C08J 2401/10* (2013.01); *C08J 2423/26* (2013.01); *C08L 2205/025* (2013.01); *C08L 2205/03* (2013.01); *C08L 2205/16* (2013.01)

(58) Field of Classification Search
CPC ............. C08L 23/12; C08L 1/02; C08L 51/06
See application file for complete search history.

(56) References Cited

U.S. PATENT DOCUMENTS

| 2011/0006454 A1* | 1/2011 | Kawashiri ................ B27N 3/04 264/176.1 |
| 2018/0036240 A1 | 2/2018 | Gho et al. |
| 2020/0115471 A1 | 4/2020 | Tsujii et al. |

FOREIGN PATENT DOCUMENTS

| JP | 2012-158842 | | 8/2012 |
| JP | 5327411 | | 8/2013 |
| JP | 2013159866 A | * | 8/2013 |
| JP | 5527489 B1 | | 6/2014 |
| JP | 2017081036 A | | 5/2017 |
| JP | 2017-105983 | | 6/2017 |
| JP | 2019-001876 | | 1/2019 |
| WO | 2014034071 A1 | | 3/2014 |

OTHER PUBLICATIONS

English Machine Translation of JP2013159866A ( A ) obtained on Mar. 15, 2024 from https://worldwide.espacenet.com/publicationDetails/claims?CC=JP&NR=2013159866A&KC=A&FT=D&ND=3&date=20130819&DB=&locale=en_EP (Year: 2013).*
International Search Report for PCT/JP2020/010872, dated Jun. 16, 2020.
Japanese Office Action for JP Patent Application No. 2024-045304, mailed Feb. 7, 2025.

* cited by examiner

*Primary Examiner* — Catherine S Branch
*Assistant Examiner* — Olga Lucia Donahue
(74) *Attorney, Agent, or Firm* — Andrus Intellectual Property Law, LLP

(57) ABSTRACT

A fibrous cellulose composite resin being excellent in strength, a method for producing the same, and a reinforcing material for resins capable of significantly improving resin strength are provided. The fibrous cellulose composite resin includes fibrous cellulose containing microfiber cellulose, a resin, and an acid-modified resin, wherein the microfiber cellulose has an average fiber width of 0.1 μm or larger, an average fiber length of 0.02 to 2.0 mm, and a percentage of fibrillation of 1.0% or higher, and hydroxyl groups substituted with carbamate groups, and the carbamate groups are ionically bonded to acidic groups of the acid-modified resin.

9 Claims, No Drawings

FIBROUS CELLULOSE COMPOSITE RESIN AND PRODUCTION METHOD THEREFOR, AND RESIN REINFORCING MATERIAL

CROSS-REFERENCE TO RELATED APPLICATIONS

This application is the U.S. national stage application of International Application PCT/JP2020/010872, filed Mar. 12, 2020, which international application was published on Oct. 8, 2020, as International Publication WO 2020/203147 in the Japanese language. The International Application claims priority of Japanese Patent Application No. 2019-065313, filed Mar. 29, 2019. The international application and Japanese application are both incorporated herein by reference, in entirety.

TECHNICAL FIELD

The present invention relates to a fibrous cellulose composite resin, a method for producing the same, and a reinforcing material for resins.

BACKGROUND ART

Fine fibers like cellulose nanofibers and microfiber cellulose (microfibrillated cellulose) have recently been attracting attention for use as a reinforcing material for resins. However, fine fibers are hydrophilic, whereas resins are hydrophobic, so that fine fibers, for use as a reinforcing material for resins, have problems with dispersibility. In view of this, the present inventors have proposed substitution of hydroxyl groups in fine fibers with carbamate groups (see Patent Literature 1). According to this proposal, dispersibility of fine fibers is improved and, consequently, the reinforcing effect on resins is improved. Yet, further enhancement of the reinforcing effect is demanded even now, and various researches are being made.

CITATION LIST

Patent Literature

Patent Literature 1: JP 2019-001876 A

SUMMARY OF INVENTION

Technical Problem

It is a primary object of the present invention to provide a fibrous cellulose composite resin with high strength, a method for producing the same, and a reinforcing material for resins capable of significantly improving the strength of the resins.

Solution to Problem

Conventional development, for example, the development described in Patent Literature 1 mentioned above, focused on modification of fine fibers, and revealed that introduction of carbamates (carbamation) was advantageous among a number of modification processes including esterification, etherification, amidation, and sulfation. In contrast, the present invention does not focus on, but premises on the introduction of carbamates and, through various tests, the present inventors have found that the above problems are solved by investigating into the physical properties of fine fibers and other substances mixed in fine fibers and resins, to thereby reach the present invention. The means thus reached are as follows.

(Means Recited in Claim 1)
A fibrous cellulose composite resin including:
fibrous cellulose, a resin, and an acid-modified resin,
wherein part or all of the fibrous cellulose is microfiber cellulose,
the microfiber cellulose has an average fiber width of 0.1 µm or larger, an average fiber length of 0.02 to 2.0 mm, and a percentage of fibrillation of 1.0% or higher, part or all of its hydroxyl groups being substituted with carbamate groups, and
part or all of the carbamate groups are ionically bonded to acidic groups of the acid-modified resin.

(Means Recited in Claim 2)
The fibrous cellulose composite resin according to claim 1, wherein a degree of substitution of the hydroxyl groups by the carbamate groups is 0.05 to 0.5.

(Means Recited in Claim 3)
The fibrous cellulose composite resin according to claim 1 or 2, wherein the acid-modified resin is a maleic anhydride-modified resin.

(Means Recited in Claim 4)
The fibrous cellulose composite resin according to claim 3, wherein the composite resin contains 1 to 200 parts by mass of the maleic anhydride-modified resin based on 100 parts by mass of the microfiber cellulose.

(Means Recited in Claim 5)
A method for producing a fibrous cellulose composite resin, including defibrating a cellulose raw material into microfiber cellulose and kneading the microfiber cellulose with a resin to obtain the fibrous cellulose composite resin,
wherein the defibrating is performed so that the microfiber cellulose has an average fiber width of 0.1 µm or larger, an average fiber length of 0.02 to 2.0 mm, and a percentage of fibrillation of 1.0% or higher,
the method further including:
prior to or following the defibrating, modifying the cellulose fibers by substituting part or all of hydroxyl groups of the cellulose fibers with carbamate groups, and
prior to or during the kneading, adding an acid-modified resin.

(Means Recited in Claim 6)
The method for producing a fibrous cellulose composite resin according to claim 5, wherein the modifying is performed prior to the defibrating.

(Means Recited in Claim 7)
A reinforcing material for thermoplastic or thermosetting resins, including:
fibrous cellulose and an acid-modified resin,
wherein part or all of the fibrous cellulose is microfiber cellulose,
the microfiber cellulose has an average fiber width of 0.1 µm or larger, an average fiber length of 0.02 to 2.0 mm, and a percentage of fibrillation of 1.0% or higher, part or all of its hydroxyl groups being substituted with carbamate groups, and
part or all of the carbamate groups are ionically bonded to acidic groups of the acid-modified resin.

Effect of the Invention

According to the present invention, there are provided a fibrous cellulose composite resin with high strength, a method for producing the same, and a reinforcing material for resins capable of significantly improving the strength of the resins.

DESCRIPTION OF EMBODIMENTS

Next, embodiments for carrying out the present invention will be discussed. The embodiments are mere examples of the present invention, and the scope of the present invention is not limited by the scopes of the present embodiments.

The fibrous cellulose composite resin according to the present embodiment contains fibrous cellulose (referred to also as cellulose fibers hereinbelow), a resin, and an acid-modified resin. Part or all of the fibrous cellulose is microfiber cellulose. The microfiber cellulose is made to have prescribed physical properties, and has hydroxyl groups (—OH), part or all of which is substituted with carbamate groups. Part or all of the carbamate groups are ionically bonded to the acidic groups of the acid-modified resin. For obtaining the fibrous cellulose composite resin, a cellulose raw material is defibrated into microfiber cellulose, and the microfiber cellulose is kneaded with a resin. The defibration is performed so that the microfiber cellulose has prescribed physical properties. Prior to or following the defibration, part or all of the hydroxyl groups of the microfiber cellulose are modified with carbamate groups. Then, prior to or during the kneading, an acid-modified resin is added. The details are discussed below.

(Microfiber Cellulose)

In the present embodiment, as part or all of the fibrous cellulose, microfiber cellulose (microfibrillated cellulose), which is a kind of fine fibers, is used. Use of microfiber cellulose significantly improves the reinforcing effect on resins. Further, microfiber cellulose has the characteristic of easier modification with carbamate groups compared to cellulose nanofibers, which are another kind of fine fibers.

In the present embodiment, microfiber cellulose refers to the fibers having a larger average fiber diameter than that of cellulose nanofibers, specifically, for example, 0.1 to 15 μm, preferably 0.2 to 10 μm. With an average fiber diameter below (less than) 0.1 μm, the microfiber cellulose differs nothing from the cellulose nanofibers, and sufficient effect to improve resin strength (in particular, flexural modulus) may not be obtained. Also, a longer time is required for defibration, which in turn requires more energy. Further, the average fiber diameter below 0.1 μm impairs dewaterability of a cellulose fiber slurry. With such an impaired dewaterability, a high amount of energy is required for drying, which in turn causes thermal deterioration of the microfiber cellulose to impair its strength. On the other hand, with an average fiber diameter over (exceeding) 15 μm, the microfiber cellulose differs nothing from pulp, and sufficient reinforcing effect may not be obtained.

The microfiber cellulose may be obtained by defibrating (making finer) a cellulose raw material (referred to also as raw material pulp hereinbelow). As the raw material pulp, one or more members may be selected and used from the group consisting of, for example, wood pulp made from hardwood, softwood, or the like; non-wood pulp made from straw, bagasse, cotton, hemp, bast fibers, or the like; and de-inked pulp (DIP) made from recovered used paper, waste paper, or the like. These various raw materials may be in the form of a ground product (powdered product), such as those referred to as cellulose-based powder.

In this regard, however, the raw material pulp is preferably wood pulp in order to avoid contamination of impurities as much as possible. As the wood pulp, one or more members may be selected and used from the group consisting of, for example, chemical pulp, such as hardwood kraft pulp (LKP) and softwood kraft pulp (NKP), and mechanical pulp (TMP).

The hardwood kraft pulp may be hardwood bleached kraft pulp, hardwood unbleached kraft pulp, or hardwood semi-bleached kraft pulp. Similarly, the softwood kraft pulp may be softwood bleached kraft pulp, softwood unbleached kraft pulp, or softwood semi-bleached kraft pulp.

As the mechanical pulp, one or more members may be selected and used from the group consisting of, for example, stone ground pulp (SGP), pressurized stone ground pulp (PGW), refiner ground pulp (RGP), chemi-ground pulp (CGP), thermo-ground pulp (TGP), ground pulp (GP), thermomechanical pulp (TMP), chemithermomechanical pulp (CTMP), refiner mechanical pulp (RMP), and bleached thermomechanical pulp (BTMP).

The raw material pulp may be pretreated by a chemical method prior to defibration. Such pretreatment by a chemical method may be, for example, hydrolysis of polysaccharides with acid (acid treatment), hydrolysis of polysaccharides with enzyme (enzyme treatment), swelling of polysaccharides with alkali (alkali treatment), oxidation of polysaccharides with an oxidizing agent (oxidation treatment), or reduction of polysaccharides with a reducing agent (reduction treatment). Among these, as a pretreatment by a chemical method, enzyme treatment is preferred, and more preferred is one or more treatments selected from acid treatment, alkali treatment, and oxidation treatment, in addition to the enzyme treatment. The enzyme treatment is discussed in detail below.

As an enzyme used in the enzyme treatment, preferably at least one of, more preferably both of cellulase enzymes and hemicellulase enzymes are used. With such enzymes, defibration of the cellulose raw material is more facilitated. It is noted that cellulase enzymes cause degradation of cellulose in the presence of water, whereas hemicellulase enzymes cause degradation of hemicellulose in the presence of water.

The cellulase enzymes may be enzymes produced by, for example, the genus *Trichoderma* (filamentous fungus), the genus *Acremonium* (filamentous fungus), the genus *Aspergillus* (filamentous fungus), the genus *Phanerochaete* (basidiomycete), the genus *Trametes* (basidiomycete), the genus *Humicola* (filamentous fungus), the genus *Bacillus* (bacteria), the genus *Schizophyllum* (bacteria), the genus *Streptomyces* (bacteria), and the genus *Pseudomonas* (bacteria). These cellulase enzymes are available as reagents or commercial products. Examples of the commercial products may include, for example, Cellulosin T2 (manufactured by HBI ENZYMES INC.), Meicelase (manufactured by MEIJI SEIKA PHARMA CO., LTD.), Novozyme 188 (manufactured by NOVOZYMES), Multifect CX10L (manufactured by GENENCOR), and cellulase enzyme GC220 (manufactured by GENENCOR).

The cellulase enzymes may also be either EG (endoglucanase) or CBH (cellobiohydrolase). EG and CBH may be used alone or in mixture, or further in mixture with hemicellulase enzymes.

The hemicellulase enzymes may be, for example, xylanase, which degrades xylan; mannase, which degrades mannan; and arabanase, which degrades araban. Pectinase, which degrades pectin, may also be used.

Hemicellulose is a polysaccharide other than pectin, which is present between cellulose microfibrils of plant cell walls. Hemicellulose has numeral varieties and varies depending on the kinds of wood and among cell wall layers. Glucomannan is a major component in the secondary walls of softwood, whereas 4-O-methylglucuronoxylan is a major component in the secondary walls of hardwood. Thus, use of mannase is preferred for obtaining fine fibers from softwood bleached kraft pulp (NBKP), whereas use of xylanase is preferred for obtaining fine fibers from hardwood bleached kraft pulp (LBKP).

The amount of the enzyme to be added with respect to the amount of the cellulose raw material may depend on, for example, the kind of enzyme, the kind of wood (either softwood or hardwood) used as a raw material, or the kind of mechanical pulp. The amount of the enzyme to be added may preferably be 0.1 to 3 mass %, more preferably 0.3 to 2.5 mass %, particularly preferably 0.5 to 2 mass %, of the amount of the cellulose raw material. With the amount of the enzyme below 0.1 mass %, sufficient effect due the addition of the enzyme may not be obtained. With the amount of the enzyme over 3 mass %, the cellulose may be saccharified to lower the yield of the fine fibers. A problem also resides in that improvement in effect worth the increased amount to be added may not be observed.

When a cellulase enzyme is used as the enzyme, the enzyme treatment is preferably carried out at a pH in a weakly acidic region (pH=3.0 to 6.9) in view of the enzymatic reactivity. On the other hand, when a hemicellulase enzyme is used as the enzyme, the enzyme treatment is preferably carried out at a pH in a weakly alkaline region (pH=7.1 to 10.0).

Whether a cellulase enzyme or a hemicellulase enzyme is used, the enzyme treatment is carried out at a temperature of preferably 30 to 70° C., more preferably 35 to 65° C., particularly preferably 40 to 60° C. At a temperature of 30° C. or higher, the enzymatic activity is hard to be lowered, and prolongation of the treatment time may be avoided. At a temperature of 70° C. or lower, enzyme inactivation may be avoided.

The duration of the enzyme treatment may depend on, for example, the type of the enzyme, the temperature in the enzyme treatment, and the pH in the enzyme treatment. Generally, the duration of the enzyme treatment is 0.5 to 24 hours.

After the enzyme treatment, it is preferred to inactivate the enzyme. Inactivation of enzymes may be effected by, for example, addition of an alkaline aqueous solution (preferably at pH 10 or higher, more preferably at pH 11 or higher) or addition of 80 to 100° C. hot water.

Next, the alkali treatment is discussed.

An alkali treatment prior to the defibration causes partial dissociation of hydroxyl groups in hemicellulose or cellulose in pulp, resulting in anionization of the molecules, which weakens intra- and intermolecular hydrogen bonds to promote dispersion of cellulose fibers during the defibration.

As the alkali used in the alkali treatment, for example, sodium hydroxide, lithium hydroxide, potassium hydroxide, an aqueous ammonia solution, or organic alkali, such as tetramethylammonium hydroxide, tetraethylammonium hydroxide, tetrabutylammonium hydroxide, and benzyltrimethylammonium hydroxide may be used. In view of the manufacturing cost, sodium hydroxide is preferably used.

The enzyme treatment, acid treatment, or oxidation treatment prior to the defibration may result in a low water retention degree, a high degree of crystallinity, and also high homogeneity of the cellulose nanofibers. In this regard, microfiber cellulose at a low water retention degree is easily dewatered, so that dewaterability of a cellulose fiber slurry may be improved.

The enzyme treatment, acid treatment, or oxidation treatment of the raw material pulp causes decomposition of the amorphous region of hemicellulose and cellulose in pulp, which leads to reduction of energy required for the defibration and to improvement in uniformity and dispersibility of the cellulose fibers. The pretreatment, however, lowers the aspect ratio of microfiber cellulose, and it is thus preferred to avoid excessive pretreatment for the purpose of obtaining a reinforcing material for resins.

The defibration of the raw material pulp may be performed by beating the raw material pulp in, for example, beaters, homogenizers, such as high-pressure homogenizers and high-pressure homogenizing apparatus, millstone friction machines, such as grinders and mills, single-screw kneaders, multi-screw kneaders, kneaders, refiners, and jet mills. It is preferred to use refiners or jet mills.

The average fiber length (average length of single fibers) of the microfiber cellulose is preferably 0.02 to 2.0 mm, more preferably 0.05 to 1.5 mm, particularly preferably 0.1 to 1.0 mm. With an average fiber length below 0.02 mm, the microfiber cellulose may not be able to form three dimensional networks among them, resulting in poor reinforcing effect on resins. With an average fiber length over 2.0 mm, the length of the microfiber cellulose differs nothing from that of the raw material pulp, so that the reinforcing effect may not be sufficient.

The average fiber length of the microfiber cellulose may be adjusted by, for example, selection, pretreatment, or defibration of the raw material pulp.

Preferably 20% or more, more preferably 40% or more, particularly preferably 60% or more of the microfiber cellulose have a fiber length of 0.2 mm or shorter. Below 20%, sufficient reinforcing effect on resins may not be obtained. On the other hand, there is no upper limit of the percentage of the microfiber cellulose having a fiber length of 0.2 mm or shorter, and all of the microfiber cellulose may have a fiber length of 0.2 mm or shorter.

The aspect ratio of the microfiber cellulose is preferably 2 to 15000, more preferably 10 to 10000. With an aspect ratio below 2, the microfiber cellulose may not be able to form three dimensional networks among them, resulting in poor reinforcing effect. With an aspect ratio over 15000, the microfiber cellulose tends to be highly entangled, which may lead to insufficient dispersion in the resin.

The percentage of fibrillation of the microfiber cellulose is preferably 1.0 to 30.0%, more preferably 1.5 to 20.0%, particularly preferably 2.0 to 15.0%. With a percentage of fibrillation over 30.0%, the area of contact with water is too large, which may make the dewatering difficult even when the defibration results in the average fiber width within a range of 0.1 µm or larger. With a percentage of fibrillation below 1.0%, the hydrogen bonding among the fibrils may be too little to form firm three dimensional networks.

The degree of crystallinity of the microfiber cellulose is preferably 50% or higher, more preferably 55% or higher, particularly preferably 60% or higher. With a degree of crystallinity below 50%, the mixability with pulp or cellulose nanofibers may be improved, whereas the strength of the fibers per se may be lowered to make it difficult to improve the strength of resins. On the other hand, the degree of crystallinity of the microfiber cellulose is preferably 95% or lower, more preferably 90% or lower, particularly preferably 85% or lower. With a degree of crystallinity over 95%, the ratio of firm hydrogen bonding within the molecules is high, which makes the fibers themselves rigid and impairs dispersibility.

The degree of crystallinity of the microfiber cellulose may arbitrarily be adjusted by, for example, selection, pretreatment, or defibration of the raw material pulp.

The pulp viscosity of the microfiber cellulose is preferably 2 cps or higher, more preferably 4 cps or higher. With a pulp viscosity of the microfiber cellulose below 2 cps, control of aggregation of the microfiber cellulose may be difficult.

The freeness of the microfiber cellulose is preferably 500 ml or less, more preferably 300 ml or less, particularly preferably 100 ml or less. With a freeness of the microfiber cellulose over 500 ml, the average fiber diameter of the microfiber cellulose exceeds 10 μm, and sufficient effect to improve resin strength may not be obtained.

The zeta potential of the microfiber cellulose is preferably −150 to 20 mV, more preferably −100 to 0 mV, particularly preferably −80 to −10 mV. With a zeta potential below −150 mV, compatibility with resins may significantly be deteriorated, resulting in insufficient reinforcing effect. With a zeta potential over 20 mV, dispersion stability may be impaired.

The water retention degree of the microfiber cellulose is preferably 80 to 400%, more preferably 90 to 350%, particularly preferably 100 to 300%. A water retention degree of the microfiber cellulose below 80% differs nothing with that of the raw material pulp, so that the reinforcing effect may be insufficient. With a water retention degree over 400%, dewaterability tends to be poor, and the microfiber cellulose tends to aggregate. In this regard, the water retention degree of the microfiber cellulose may be made still lower by the substitution of its hydroxy groups with carbamate groups, which improves dewaterability and drying property.

The water retention degree of the microfiber cellulose may arbitrarily be adjusted by, for example, selection, pretreatment, or defibration of the raw material pulp.

The content of the microfiber cellulose in the cellulose fibers is preferably 60 to 100 mass %, more preferably 70 to 99 mass %, particularly preferably 80 to 98 mass %. With a content of the microfiber cellulose below 60 mass %, sufficient reinforcing effect may not be obtained. Further with a content of the microfiber cellulose below 60 mass %, the contents of pulp and cellulose nanofibers are proportionally higher, so that the effect obtained from containing the microfiber cellulose may not be achieved.

The microfiber cellulose is made to have carbamate groups by, for example, the process to be discussed. In other words, the microfiber cellulose has carbamate (esters of carbamic acid) introduced. A carbamate group is denoted as —O—CO—NH—, and may be, for example, —O—CO—NH$_2$, —O—CONHR, or —O—CO—NR$_2$. That is, a carbamate group may be represented by the following structural formula (1):

[Formula 1]

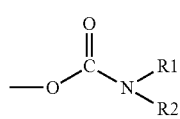

In the formula, R is independently at least any of a saturated straight chain hydrocarbon group, a saturated branched hydrocarbon group, a saturated cyclic hydrocarbon group, an unsaturated straight chain hydrocarbon group, an unsaturated branched hydrocarbon group, an aromatic group, and derivative groups thereof.

The saturated straight chain hydrocarbon group may be, for example, a straight chain alkyl group having 1 to 10 carbon atoms, such as a methyl group, an ethyl group, or a propyl group.

The saturated branched hydrocarbon group may be, for example, a branched alkyl group having 3 to 10 carbon atoms, such as an isopropyl group, a sec-butyl group, an isobutyl group, or a tert-butyl group.

The saturated cyclic hydrocarbon group may be, for example, a cycloalkyl group, such as a cyclopentyl group, a cyclohexyl group, or a norbornyl group.

The unsaturated straight chain hydrocarbon group may be, for example, a straight chain alkenyl group having 2 to 10 carbon atoms, such as an ethenyl group, a propene-1-yl group, or a propene-3-yl group, or a straight chain alkynyl group having 2 to 10 carbon atoms, such as an ethynyl group, a propyn-1-yl group, or a propyn-3-yl group.

The unsaturated branched hydrocarbon group may be, for example, a branched alkenyl group having 3 to 10 carbon atoms, such as a propene-2-yl group, a butene-2-yl group, or a butene-3-yl group, or a branched alkynyl group having 4 to 10 carbon atoms, such as a butyne-3-yl group.

The aromatic group may be, for example, a phenyl group, a tolyl group, a xylyl group, or a naphthyl group.

The derivative groups may be a saturated straight chain hydrocarbon group, a saturated branched hydrocarbon group, a saturated cyclic hydrocarbon group, an unsaturated straight chain hydrocarbon group, an unsaturated branched hydrocarbon group, or an aromatic group, having one or a plurality of hydrogen atoms thereof substituted with a substituent (for example, a hydroxy group, a carboxy group, or a halogen atom).

In the microfiber cellulose having carbamate groups (having carbamate introduced), part or all of the highly polar hydroxy groups have been substituted with relatively less polar carbamate groups. Thus, such microfiber cellulose has low hydrophilicity and high affinity to resins having lower polarity. As a result, the microfiber cellulose has excellent homogeneous dispersibility in the resin. Further, a slurry of the microfiber cellulose has a low viscosity and good handling property.

The lower limit of the substitution degree of the hydroxy groups of the microfiber cellulose with the carbamate groups is preferably 0.05, more preferably 0.1, particularly preferably 0.2. With a substitution degree of 0.05 or higher, the effect obtained from the introduction of carbamate is ensured. On the other hand, the upper limit of the substitution degree is preferably 1, more preferably 0.5, particularly preferably 0.4. In this regard, the problem is that microfiber cellulose with a higher substitution degree is expensive.

Here, cellulose is a polymer having anhydroglucose as a structural unit, wherein one structural unit includes three hydroxy groups. Accordingly, when all the hydroxy groups are substituted with carbamate groups, the degree of substitution is 3.

<Carbamation>

The introduction of carbamate (carbamation) into microfiber cellulose (or cellulose raw material when the carbamation is effected before defibration) may be performed by carbamation of the cellulose raw material followed by making the resulting product finer, or by making the cellulose raw material finer followed by carbamation. In the present specification, discussion of the defibration of cellulose raw material precedes discussion of the carbamation (modification), but either the defibration or the carbamation may precede. However, it is preferred to perform the carbamation first, followed by the defibration. This is because the cellulose raw material before the defibration may be highly effectively dewatered, and the defibration of the cellulose raw material may be facilitated by heating associated with the carbamation.

The process of carbamating the microfiber cellulose may generally be divided into, for example, a mixing step, a removing step, and a heating step. Here, the mixing step and the removing step may together be referred to as a preparation step wherein a mixture to be subjected to the heating step is prepared.

In the mixing step, the microfiber cellulose and urea or derivatives thereof (sometimes referred to simply as "urea and the like" hereinbelow) are mixed in a dispersion medium.

The urea or the derivatives thereof may be, for example, urea, thiourea, biuret, phenylurea, benzylurea, dimethylurea, diethylurea, tetramethylurea, or compounds obtained by substituting the hydrogen atoms of urea with alkyl groups. One or a combination of a plurality of these urea or derivatives thereof may be used, and use of urea is preferred.

The lower limit of the mixing ratio by mass of the urea and the like to the cellulose raw material (urea and the like/cellulose raw material) is preferably 10/100, more preferably 20/100. The upper limit thereof is preferably 300/100, more preferably 200/100. With a mixing ratio by mass of 10/100 or higher, the carbamation efficiency is improved. With a mixing ratio by mass over 300/100, the carbamation plateaus.

The dispersion medium is usually water, but other dispersion media, such as alcohol or ether, or a mixture of water and other dispersion media may be used.

In the mixing step, for example, the microfiber cellulose and the urea and the like may be added to water, the microfiber cellulose may be added to an aqueous solution of the urea and the like, or the urea and the like may be added to a slurry containing the microfiber cellulose. The addition may be followed by stirring for homogeneous mixing. Further, the dispersion liquid containing the microfiber cellulose and the urea and the like may optionally contain other components.

In the removing step, the dispersion medium is removed from the dispersion liquid containing the microfiber cellulose and the urea and the like obtained from the mixing step. By removing the dispersion medium, the urea and the like may efficiently be reacted in the subsequent heating step.

The removal of the dispersion medium is preferably carried out by volatilizing the dispersion medium under heating. By this means, only the dispersion medium may efficiently be removed, leaving the components including the urea and the like.

The lower limit of the heating temperature in the removing step is, when the dispersion medium is water, preferably 50° C., more preferably 70° C., particularly preferably 90° C. At a heating temperature of 50° C. or higher, the dispersion medium may efficiently be volatilized (removed). On the other hand, the upper limit of the heating temperature is preferably 120° C., more preferably 100° C. At a heating temperature over 120° C., the dispersion medium and urea may react, resulting in self-decomposition of urea.

In the removing step, duration of the heating may suitably be adjusted depending on the solid concentration of the dispersion liquid, or the like, and may specifically be, for example, 6 to 24 hours.

In the heating step following the removing step, the mixture of the microfiber cellulose and the urea and the like is heat treated. In this heating step, part or all of the hydroxy groups of the microfiber cellulose are reacted with the urea and the like and substituted with carbamate groups. More specifically, the urea and the like, when heated, is decomposed into isocyanic acid and ammonia as shown by the reaction formula (1) below, and the isocyanic acid, which is highly reactive, modifies the hydroxyl groups of cellulose into carbamate groups as shown by the reaction formula (2) below.

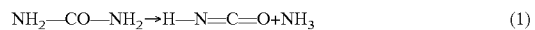

$$NH_2-CO-NH_2 \rightarrow H-N=C=O+NH_3 \tag{1}$$

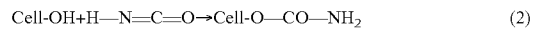

$$Cell\text{-}OH+H-N=C=O \rightarrow Cell\text{-}O-CO-NH_2 \tag{2}$$

The lower limit of the heating temperature in the heating step is preferably 120° C., more preferably 130° C., particularly preferably the melting point of urea (about 134° C.) or higher, still more preferably 140° C., most preferably 150° C. At a heating temperature of 120° C. or higher, carbamation proceeds efficiently. The upper limit of the heating temperature is preferably 200° C., more preferably 180° C., particularly preferably 170° C. At a heating temperature over 200° C., the microfiber cellulose may decompose, which may lead to insufficient reinforcing effect.

The lower limit of duration of the heating in the heating step is preferably 1 minute, more preferably 5 minutes, particularly preferably 30 minutes, still more preferably 1 hour, most preferably 2 hours. With the heating for 1 minute or longer, the carbamation reaction may be ensured. On the other hand, the upper limit of duration of the heating is preferably 15 hours, more preferably 10 hours. The heating for over 15 hours is not economical, and sufficient carbamation may be effected in 15 hours.

The heat treatment discussed above is preferably performed in an acidic range. In an acidic range, the carbamation proceeds more securely. The upper pH limit of the mixture in the heating step is preferably 6, more preferably 5, particularly preferably 4. The lower pH limit thereof is preferably 1, more preferably 2, particularly preferably 3. The pH adjustment may be performed by adding to the mixture an acidic compound (for example, acetic acid or citric acid) or an alkaline compound (for example, sodium hydroxide or calcium hydroxide).

For the heating in the heating step, for example, a hot air dryer, a paper machine, or a dry pulp machine may be used.

The mixture obtained from the heat treatment may be washed. The washing may be carried out with water or the like. By this washing, residual, unreacted urea and the like may be removed.

(Cellulose Nanofibers)

In the present embodiment, cellulose nanofibers may be contained as the fibrous cellulose, together with the microfiber cellulose. Cellulose nanofibers are fine fibers, like microfiber cellulose, and have a role to complement the microfiber cellulose in enhancing the strength of resins. However, the fine fibers are preferably only the microfiber cellulose without cellulose nanofibers, where possible. In case cellulose nanofibers are contained, the following cellulose nanofibers are preferred.

First, cellulose nanofibers may be obtained by defibration (making finer) of raw material pulp (cellulose raw material). The raw material pulp may be and preferably be the same as those for the microfiber cellulose.

The raw material pulp for cellulose nanofibers may be pretreated and defibrated in the same manner as for the microfiber cellulose. However, the degree of defibration is different, and it is required to perform the defibration so that the average fiber diameter falls, for example, below 0.1 μm. Explanations will be made below mainly on the differences from the microfiber cellulose.

The average fiber diameter (average fiber width, or average of diameters of single fibers) of the cellulose nanofibers is preferably 4 to 100 nm, more preferably 10 to 80 nm. With an average fiber diameter of the cellulose nanofibers below 4 nm, the dewaterability may be low. In the present embodiment wherein the cellulose nanofibers are mixed with a dispersant, the dispersant may not sufficiently cover (not sufficiently cling to) the cellulose nanofibers, resulting in insufficient improvement in dispersibility. On the other hand, with an average fiber diameter over 100 nm, the cellulose nanofibers are no longer cellulose nanofibers.

The average fiber diameter of the cellulose nanofibers may be adjusted by, for example, selection, pretreatment, or defibration of the raw material pulp.

The average fiber length (lengths of single fibers) of the cellulose nanofibers is preferably 0.1 to 1000 μm, more preferably 0.5 to 500 μm. With an average fiber length below 0.1 μm, the cellulose nanofibers may not be able to form three dimensional networks among them, resulting in insufficient reinforcing effect. With an average fiber length over 1000 μm, the cellulose nanofibers tend to be entangled, and dispersibility may not be improved sufficiently.

The average fiber length of the cellulose nanofibers may be adjusted by, for example, selection, pretreatment, or defibration of the raw material pulp.

The water retention degree of the cellulose nanofibers may be adjusted by, for example, selection, pretreatment, or defibration of the raw material pulp.

The degree of crystallinity of the cellulose nanofibers is preferably 95 to 50%, more preferably 90 to 60%. With the degree of crystallinity of the cellulose nanofibers within the above range, the resin strength is securely improved.

The degree of crystallinity may arbitrarily be adjusted by, for example, selection, pretreatment, or defibration of the raw material pulp.

The pulp viscosity of the cellulose nanofibers is preferably 1.0 cps or higher, more preferably 2.0 cps or higher. The pulp viscosity is a viscosity of a solution of cellulose dissolved in a copper-ethylenediamine solution, and a higher pulp viscosity indicates higher degree of polymerization of cellulose. With the pulp viscosity of 1.0 cps or higher, dewaterability may be imparted to the slurry while decomposition of the cellulose nanofibers during kneading with a resin may be suppressed, to thereby achieve sufficient reinforcing effect.

The cellulose nanofibers obtained by the defibration may be dispersed in an aqueous medium and kept in the form of a dispersion, as needed, prior to mixing with other cellulose fibers. It is particularly preferred that the aqueous medium is entirely water (aqueous solution). However, part of the aqueous medium may be another liquid compatible with water. Such another liquid may be, for example, a lower alcohol having 3 or less carbon atoms.

The B-type viscosity of the dispersion of the cellulose nanofibers (1% concentration) is preferably 10 to 2000 cp, more preferably 30 to 1500 cp. With the B-type viscosity of the dispersion within the above range, mixing with other cellulose fibers may be facilitated, and the dewaterability of the cellulose fiber slurry may be improved.

The content percentage of the cellulose nanofibers in the cellulose fibers is preferably 40 mass % or less, more preferably 20 mass % or less. With the content percentage over 40 mass %, the cellulose nanofibers may firmly aggregate and may not be dispersed in resins, providing insufficient reinforcing effect. As discussed above, it is most preferred that the cellulose nanofibers are not contained, that is, at a content percentage of 0 mass %.

The cellulose nanofibers may be carbamated in the same manner as for the microfiber cellulose, or the like, as needed. However, carbamation of cellulose nanofibers is usually difficult.

(Pulp)

The fibrous cellulose may contain pulp, in addition to the microfiber cellulose. Pulp has a role to remarkably improve the dewaterability of a cellulose fiber slurry. It is preferred, however, that the content percentage of the pulp is within a prescribed range (see below).

The content percentage of the pulp in the cellulose fibers is preferably 40 mass % or lower, more preferably 20 mass % or lower. A content percentage of the pulp over 40 mass % results in decrease in the content percentage of the microfiber cellulose, so that the resin strength may not be secured. Like the cellulose nanofibers, it is most preferred that the pulp is also not contained, that is, at a content percentage of 0 mass %.

The pulp may be the same as the raw material pulp for the microfiber cellulose or the like, and may preferably be the same as the raw material pulp for the microfiber cellulose. As the pulp, use of the same material as the raw material pulp for the microfiber cellulose may improve the affinity of the cellulose fibers, to thereby improve the homogeneity of the cellulose fiber slurry.

(Slurry)

The fibrous cellulose containing the fine fibers is dispersed in an aqueous medium to prepare a dispersion (slurry), as needed. The aqueous medium is particularly preferably water in its entirety, but aqueous medium partly containing another liquid compatible with water may also be used. Such another liquid may be, for example, a lower alcohol having 3 or less carbon atoms.

The solid concentration of the slurry is preferably 0.1 to 10.0 mass %, more preferably 0.5 to 5.0 mass %. With a solid concentration below 0.1 mass %, an excessive amount of energy may be required for dewatering and drying. With a solid concentration over 10.0 mass %, fluidity of the slurry per se may be too low to homogeneously admix with the dispersant.

(Acid-Modified Resin)

The acid-modified resin has acidic groups, which are ionically bonded to part or all of the carbamate groups. By this ionic bonding, the reinforcing effect on resins is improved.

The acid-modified resin may be, for example, acid-modified polyolefin resins, acid-modified epoxy resins, or acid-modified styrene elastomer resins. It is preferred to use acid-modified polyolefin resins. An acid-modified polyolefin resin is a copolymer of an unsaturated carboxylic acid component and a polyolefin component.

As the polyolefin component, one or more polymers of alkenes may be selected and used from the group consisting of, for example, ethylene, propylene, butadiene, and isoprene. Preferably, use of a polypropylene resin, which is a polymer of propylene, is preferred.

As the unsaturated carboxylic acid component, one or more members may be selected and used from the group consisting of, for example, maleic anhydrides, phthalic anhydrides, itaconic anhydrides, citraconic anhydrides, and citric anhydrides. Preferably, use of maleic anhydrides is preferred. In other words, use of maleic anhydride-modified polypropylene resins is preferred.

The amount of the acid-modified resin to be added is preferably 0.1 to 1000 parts by mass, more preferably 1 to 500 parts by mass, particularly preferably 10 to 200 parts by mass, based on 100 parts by mass of the microfiber cellulose. In particular, when the acid-modified resin is a maleic anhydride-modified polypropylene resin, the amount to be added is preferably 1 to 200 parts by mass, more preferably 10 to 100 parts by mass. With an amount of the acid-modified resin to be added below 0.1 parts by mass, improvement in strength is not sufficient. An amount to be added over 1000 parts by mass is excessive and tends to lower the strength.

The weight average molecular weight of the maleic anhydride-modified polypropylene is, for example, 1000 to 100000, preferably 3000 to 50000.

The acid value of the maleic anhydride-modified polypropylene is preferably 0.5 mgKOH/g or more and 100 mgKOH/g or less, more preferably 1 mgKOH/g or more and 50 mgKOH/g or less.

(Dispersant)

The fibrous cellulose containing the microfiber cellulose and the like is more preferably mixed with a dispersant. As the dispersant, compounds having an amine group and/or a hydroxyl group in aromatics and compounds having an amine group and/or a hydroxyl group in aliphatics are preferred.

Examples of the compounds having an amine group and/or a hydroxyl group in aromatics may include anilines, toluidines, trimethylanilines, anisidines, tyramines, histamines, tryptamines, phenols, dibutylhydroxytoluenes, bisphenol A's, cresols, eugenols, gallic acids, guaiacols, picric acids, phenolphthaleins, serotonins, dopamines, adrenalines, noradrenalines, thymols, tyrosines, salicylic acids, methyl salicylates, anisyl alcohols, salicyl alcohols, sinapyl alcohols, difenidols, diphenylmethanols, cinnamyl alcohols, scopolamines, triptophols, vanillyl alcohols, 3-phenyl-1-propanols, phenethyl alcohols, phenoxyethanols, veratryl alcohols, benzyl alcohols, benzoins, mandelic acids, mandelonitriles, benzoic acids, phthalic acids, isophthalic acids, terephthalic acids, mellitic acids, and cinnamic acids.

Examples of the compounds having an amine group and/or a hydroxyl group in aliphatics may include capryl alcohols, 2-ethylhexanols, pelargonic alcohols, capric alcohols, undecyl alcohols, lauryl alcohols, tridecyl alcohols, myristyl alcohols, pentadecyl alcohols, cetanols, stearyl alcohols, elaidyl alcohols, oleyl alcohols, linoleyl alcohols, methylamines, dimethylamines, trimethylamines, ethylamines, diethylamines, ethylenediamines, triethanolamines, N,N-diisopropylethylamines, tetramethylethylenediamines, hexamethylenediamines, spermidines, spermines, amantadines, formic acids, acetic acids, propionic acids, butyric acids, valeric acids, caproic acids, enanthic acids, caprylic acids, pelargonic acids, capric acids, lauric acids, myristic acids, palmitic acids, margaric acids, stearic acids, oleic acids, linolic acids, linoleic acids, arachidonic acids, eicosapentaenoic acids, docosahexaenoic acids, and sorbic acids.

The dispersants mentioned above block the hydrogen bonding among the molecules of the microfiber cellulose. Consequently, the microfiber cellulose, in kneading with a resin, is reliably dispersed (redispersed) in the resin. Further, the dispersants mentioned above also have a role to improve the compatibility of the microfiber cellulose and the resin. In this regard, the dispersibility of the microfiber cellulose in the resin is improved.

It is conceivable, in kneading the fibrous cellulose and the resin, to add a separate compatibilizer (agent), but mixing the fibrous cellulose and the dispersant (agent) in advance, rather than adding the agent at this stage, results in more uniform clinging of the agent over the fibrous cellulose, to thereby enhance the effect to improve compatibility with the resin.

In addition, as the melting point of polypropylene, for example, is 160° C., the fibrous cellulose and the resin are kneaded at about 180° C. In this state, the dispersant (liquid), if added, will be dried instantaneously. In this regard, there is known to prepare a masterbatch (a composite resin containing a high concentration of microfiber cellulose) using a resin with a lower melting point, and then adding a resin with an ordinary melting point to the masterbatch to lower the concentration of microfiber cellulose in the resin. However, since resins with a lower melting point are generally lower in strength, the strength of the composite resin may be lower according to this method.

The amount of the dispersant to be mixed is preferably 0.1 to 1000 parts by mass, more preferably 1 to 500 parts by mass, particularly preferably 10 to 200 parts by mass, based on 100 parts by mass of the microfiber cellulose. With an amount of the dispersant to be added below 0.1 parts by mass, improvement in strength may not be sufficient. An amount of the dispersant to be added over 1000 parts by mass is excessive and tends to lower the strength.

It is assumed that the acid-modified resin, which has the acidic groups ionically bonded with the carbamate groups of the microfiber cellulose to improve the compatibility and the reinforcing effect, has a large molecular weight and thus blends well with the resin, contributing to the improvement in strength. On the other hand, the dispersant mentioned above is interposed between the hydroxyl groups of the microfiber cellulose to prevent aggregation, and thus improves the dispersibility in the resin. Further, the dispersant has a lower molecular weight than that of the acid-modified resin, and thus can enter the narrow space among the molecules of the microfiber cellulose, where the acid-modified resin cannot enter, to play a role to improve the dispersibility and thus the strength. In view of the above, it is preferred that the molecular weight of the acid-modified resin is 2 to 2000 times, preferably 5 to 1000 times the molecular weight of the dispersant.

This point is discussed in more detail. Resin powder is physically interposed among the molecules of the microfiber cellulose to block the hydrogen bonding, thereby improving the dispersibility of the microfiber cellulose. On the other hand, the acid-modified resin improves the compatibility by ionically bonding its acidic groups with the carbamate groups of the microfiber cellulose, to thereby enhance the reinforcing effect. Here, the dispersant has the same function to block the hydrogen bonding among the molecules of the microfiber cellulose, while the resin powder, which is on the micrometer order, is physically interposed to interfere with the hydrogen bonding. Accordingly, though the dispersibility is lower than that of the dispersant, the resin powder per se is molten to form a matrix, and thus does not contribute to deterioration of the physical properties. In contrast, the dispersant, which is on the molecular level and extremely small, covers the microfiber cellulose to block the hydrogen bonding, which results in higher efficacy in improving dispersibility of the microfiber cellulose. However, the dispersant may remain in the resin and contribute to deterioration of the physical properties.

(Production Method)

The mixture of the fibrous cellulose and the acid-modified resin as well as the dispersant and the like may be dried and ground into a powdered product prior to kneading with the resin. In this form, no drying of the fibrous cellulose is needed for kneading with the resin, which is thermally efficient. Further, when the dispersant is already mixed in the mixture, the fine fibers including the microfiber cellulose and the like are less likely to be unredispersible even after the mixture is dried.

The mixture is dehydrated into a dehydrated product, as needed, prior to the drying. For the dehydration, one or more dehydrators may be selected and used from the group consisting of, for example, belt presses, screw presses, filter presses, twin rolls, twin wire formers, valveless filters, center disk filters, film treatment units, and centrifuges.

For drying the mixture, one or more means may be selected and used from the group consisting of, for example, rotary kiln drying, disk drying, air flow drying, medium fluidized drying, spray drying, drum drying, screw conveyor drying, paddle drying, single-screw kneading drying, multi-screw kneading drying, vacuum drying, and stirring drying.

The dried mixture (dried product) is pulverized into a powdered product. For pulverizing the dried product, one or more means may be selected and used from the group consisting of, for example, bead mills, kneaders, dispersers, twist mills, cut mills, and hammer mills.

The average particle size of the powdered product is preferably 1 to 10000 μm, more preferably 10 to 5000 μm, particularly preferably 100 to 1000 μm. With an average particle size over 10000 μm, the powdered product may have inferior kneadability with the resin. On the other hand, making the average particle size of the powdered product smaller than 1 μm requires a high amount of energy, which is not economical.

The average particle size of the powdered product may be controlled by regulating the degree of pulverization, or by classification in classification apparatus, such as filters or cyclones.

The bulk specific gravity of the mixture (powdered product) is preferably 0.03 to 1.0, more preferably 0.04 to 0.9, particularly preferably 0.05 to 0.8. A bulk specific gravity exceeding 1.0 means the hydrogen bonding among the molecules of the fibrous cellulose being still firmer, so that dispersion in the resin is not easy. A bulk specific gravity less than 0.03 is disadvantageous in view of transportation cost.

The bulk specific gravity is a value determined in accordance with JIS K7365.

The moisture percentage of the mixture (powdered product) is preferably 50% or lower, more preferably 30% or lower, particularly preferably 10% or lower. With a moisture percentage over 50%, a significant amount of energy is required for kneading with the resin, which is not economical.

The moisture percentage is a value determined by holding a sample at 105° C. for 6 hours or longer in a constant temperature dryer until fluctuation in mass is not observed and measuring the mass as a mass after drying, and calculated by the following formula:

Moisture percentage of fibers (%)=[(mass before drying−mass after drying)/mass before drying]× 100

The microfiber cellulose thus dehydrated and dried may contain a resin. The resin, when contained, blocks the hydrogen bonding among the molecules of the dehydrated, dried microfiber cellulose to improve the dispersibility in the resin during the kneading.

The resin to be contained in the dehydrated, dried microfiber cellulose may be in the form of, for example, powder, pellets, or sheets, with the powder (powdered resin) being preferred.

When in the form of powder, the resin powder contained in the dehydrated, dried microfiber cellulose may have an average particle size of preferably 1 to 10000 μm, more preferably 10 to 5000 μm, particularly preferably 100 to 1000 μm. With an average particle size over 10000 μm, the particle size may be too large for the powder to enter the kneading apparatus. With an average particle size below 1 μm, the powder may be too fine to block the hydrogen bonding among the molecules of the microfiber cellulose. Incidentally, the resin to be used here, such as the powdered resin, may be of the same kind as or different from the resin to be kneaded with the microfiber cellulose (the resin as a main raw material), but the same kind is preferred.

The resin powder with an average particle size of 1 to 10000 μm is preferably mixed in an aqueous dispersion state prior to the dehydration and drying. By mixing in an aqueous dispersion state, the resin powder may be dispersed homogeneously among the molecules of the microfiber cellulose, resulting in homogeneous dispersion of the microfiber cellulose in the composite resin obtained from the kneading, to thereby further improve the strength properties.

The powdered product thus obtained (reinforcing material for resins) is kneaded with a resin, to thereby obtain a fibrous cellulose composite resin. The kneading may be performed by, for example, mixing the resin in the form of pellets with the powdered product, or by first melting the resin to obtain a molten product and then mixing the powdered product into the molten product. The acid-modified resin, the dispersant, and the like may be added at this stage.

For the kneading treatment, one or more members may be selected and used from the group consisting of, for example, single-screw or multi-screw (with two or more screws) kneaders, mixing rolls, kneaders, roll mills, Banbury mixers, screw presses, and dispersers. Among these, multi-screw kneaders with two or more screws are preferably used. Two or more multi-screw kneaders with two or more screws, arranged in parallel or in series, may also be used.

The peripheral speed of the screws of the multi-screw kneaders with two or more screws may be preferably 0.2 to 200 m/min, more preferably 0.5 to 150 m/min, particularly preferably 1 to 100 m/min. At a peripheral speed below 0.2 m/min, the microfiber cellulose may not be successfully dispersed in the resin. At a peripheral speed over 200 m/min, the shearing force applied to the microfiber cellulose may be excessive, so that the reinforcing effect may not be obtained.

In the kneader used in the present embodiment, the ratio of the screw diameter to the length of the kneading section is preferably 15 to 60. At a ratio below 15, the kneading section is so short that the microfiber cellulose and the resin may not be mixed. At a ratio over 60, the kneading section is so long that the shear load on the microfiber cellulose may be too high to provide the reinforcing effect.

The temperature for the kneading treatment is the glass transition temperature of the resin or higher and may depend on the type of the resin, and is preferably 80 to 280° C., more preferably 90 to 260° C., particularly preferably 100 to 240° C.

As the resin, at least either one of a thermoplastic resin or a thermosetting resin may be used.

As a thermoplastic resin, one or more resins may be selected and used from the group consisting of, for example, polyolefins, such as polypropylene (PP) and polyethylene (PE), polyester resins, such as aliphatic polyester resins and aromatic polyester resins, polystyrenes, polyacrylic resins, such as methacrylates and acrylates, polyamide resins, polycarbonate resins, and polyacetal resins.

It is preferred, however, to use at least either one of polyolefins or polyester resins. Polyolefins may preferably be polypropylenes. Polyester resins may be aliphatic polyester resins, such as polylactic acid or polycaprolactone, or aromatic polyester resins, such as polyethylene terephthalate, and biodegradable polyester resins (also referred to simply as "biodegradable resins") may preferably be used.

As the biodegradable resin, one or more members may be selected and used from the group consisting of, for example, hydroxycarboxylic acid-based aliphatic polyesters, caprolactone-based aliphatic polyesters, and dibasic acid polyesters.

As the hydroxycarboxylic acid-based aliphatic polyester, one or more members may be selected and used from the group consisting of, for example, homopolymers of a hydroxycarboxylic acid, such as lactic acid, malic acid, glucose acid, or 3-hydroxybutyric acid, and copolymers using at least one of these hydroxycarboxylic acids. It is preferred to use polylactic acid, a copolymer of lactic acid and any of the hydroxycarboxylic acids other than lactic acid, polycaprolactone, or a copolymer of caprolactone and at least one of the hydroxycarboxylic acids, and particularly preferred to use polylactic acid.

The lactic acid may be, for example, L-lactic acid or D-lactic acid, and a single kind or a combination of two or more kinds of these lactic acids may be used.

As the caprolactone-based aliphatic polyester, one or more members may be selected and used from the group consisting of, for example, homopolymers of polycaprolactone, and copolymers of polycaprolactone or the like and any of the hydroxycarboxylic acids mentioned above.

As the dibasic acid polyester, one or more members may be selected and used from the group consisting of, for example, polybutylene succinates, polyethylene succinates, and polybutylene adipates.

A single kind alone or a combination of two or more kinds of the biodegradable resins may be used.

Examples of the thermosetting resins may include, for example, phenol resins, urea resins, melamine resins, furan resins, unsaturated polyesters, diallyl phthalate resins, vinyl ester resins, epoxy resins, polyurethane-based resins, silicone resins, and thermosetting polyimide-based resins. A single kind or a combination of two or more kinds of these resins may be used.

The resin may contain an inorganic filler, preferably at a rate that does not disadvantageously affect thermal recycling.

Examples of the inorganic filler may include, for example, simple substances of metal elements belonging to Groups I to VIII of the Periodic Table, such as Fe, Na, K, Cu, Mg, Ca, Zn, Ba, Al, Ti, or a silicon element; oxides thereof, hydroxides thereof, carbonates thereof, sulfates thereof, silicates thereof, or sulfites thereof; and various clay minerals formed of these compounds.

Specific examples of the inorganic filler may include, for example, barium sulfate, calcium sulfate, magnesium sulfate, sodium sulfate, calcium sulfite, zinc oxide, silica, heavy calcium carbonate, light calcium carbonate, aluminum borate, alumina, iron oxide, calcium titanate, aluminum hydroxide, magnesium hydroxide, calcium hydroxide, sodium hydroxide, magnesium carbonate, calcium silicate, clay wollastonite, glass beads, glass powder, silica sand, silica stone, quartz powder, diatomaceous earth, white carbon, and glass fibers. A plurality of these inorganic fillers may be contained. An inorganic filler contained in de-inked pulp may also be used.

The mixing ratio of the fibrous cellulose and the resin is preferably 1 part by mass or more of the fibrous cellulose to 99 parts by mass or less of the resin, more preferably 2 parts by mass or more of the fibrous cellulose to 98 parts by mass or less of the resin, particularly preferably 3 parts by mass or more of the fibrous cellulose to 97 parts by mass or less of the resin. Further, the ratio is preferably 50 parts by mass or less of the fibrous cellulose to 50 parts by mass or more of the resin, more preferably 40 parts by mass or less of the fibrous cellulose to 60 parts by mass or more of the resin, particularly preferably 30 parts by mass or less of the fibrous cellulose to 70 parts by mass or more of the resin. Particularly, with 10 to 50 parts by mass of the fibrous cellulose, the strength, in particular the bending strength and the tensile elastic modulus, of the resin composition may significantly be improved.

It is noted that the ratio of the fibrous cellulose and the resin contained in the eventually obtained resin composition is usually the same as the mixing ratio of the fibrous cellulose and the resin mentioned above.

The difference in solubility parameter $(cal/cm^3)^{1/2}$ (SP value) between the microfiber cellulose and the resin, that is, supposing that the SP value of the microfiber cellulose is $SP_{MFC}$ value and the SP value of the resin is $SP_{POL}$ value, the difference in SP value may be obtained by the formula: Difference in SP value=$SP_{MFC}$ value–$SP_{POL}$ value. The difference in SP value is preferably 10 to 0.1, more preferably 8 to 0.5, particularly preferably 5 to 1. With a difference in SP value over 10, the microfiber cellulose is not dispersed in the resin, and thus the reinforcing effect may not be obtained. With a difference in SP value below 0.1, the microfiber cellulose is dissolved in the resin and does not function as a filler, so that the reinforcing effect cannot be obtained. In this regard, a smaller difference between the $SP_{POL}$ value of the resin (solvent) and the $SP_{MFC}$ value of the microfiber cellulose (solute) indicates higher reinforcing effect. It is noted that the solubility parameter $(cal/cm^3)^{1/2}$ (SP value) is a scale of solvent/solute intermolecular force, and a solvent and a solute having closer SP values results in higher solubility.

(Other Components)

In addition to the fine fibers, pulp, and the like discussed above, the resin composition may contain or may be caused to contain fibers derived from plant materials obtained from various plants, such as kenaf, jute hemp, manila hemp, sisal hemp, ganpi, mitsumata, mulberry, banana, pineapple, coconut, corn, sugar cane, bagasse, palm, papyrus, reed, esparto, survival grass, wheat, rice, bamboo, various kinds of softwood (cedar, cypress, and the like), hardwood, and cotton.

In the resin composition, one or more members selected from the group consisting of, for example, antistatic agents, flame retardants, antibacterial agents, colorants, radical scavengers, and foaming agents may be added without disturbing the effects of the present invention. These materials may be added to the dispersion of the fibrous cellulose, added while the fibrous cellulose and the resin are kneaded, added to the resulting kneaded product, or added otherwise. In view of the manufacturing efficiency, those materials may preferably be added while the fibrous cellulose and the resin are kneaded.

The resin composition may contain, as a rubber component, ethylene/α-olefin copolymer elastomers or styrene-butadiene block copolymers. Examples of α-olefins may include butene, isobutene, pentene, hexene, methyl-pentene, octene, decene, and dodecane.

(Second Additive: Ethylene Glycol and the Like)

In kneading the microfiber cellulose and the resin, at least one or more additives (second additive) selected from the group consisting of ethylene glycol, derivatives of ethylene glycol, ethylene glycol polymers, and derivatives of ethylene glycol polymers may be added, in addition to the additive, like polybasic acids. Addition of the second additive significantly improves dispersibility of the microfiber cellulose. In this regard, it is known by the present inventors and others that the dispersibility of cellulose fibers, when in the form of cellulose nanofibers, are hard to be improved. Irrespective of this, it is assumed that the second additive is interposed between the fibers of the microfiber cellulose to reduce the aggregation in the resin to thereby improve the dispersibility. In contrast, since cellulose nanofibers have a remarkably higher specific surface area than that of the microfiber cellulose, it is assumed that the second additive, even if added excessively, does not enter between cellulose nanofibers.

The amount of the second additive to be added may be preferably 0.1 to 1000 parts by mass, more preferably 1 to 500 parts by mass, particularly preferably 10 to 200 parts by mass, based on 100 parts by mass of the microfiber cellulose. With the amount below 0.1 parts by mass, the second additive may not contribute to the improvement in dispersibility of the microfiber cellulose. With the amount over 1000 parts by mass, the second additive is excessive and may adversely impair the resin strength.

The molecular weight of the second additive is preferably 1 to 20000, more preferably 10 to 4000, particularly preferably 100 to 2000. The molecular weight of the second additive below 1 is physically impossible. On the other hand, with a molecular weight over 20000, the second additive may be too bulky to enter between the fibers of microfiber cellulose.

(Molding Treatment)

The kneaded product of the fibrous cellulose and the resin may be molded into a desired shape, following another kneading, if necessary. The size, thickness, shape, and the like resulting from the molding are not particularly limited, and the molded product may be in the form of, for example, sheets, pellets, powders, or fibers.

The temperature during the molding treatment is at or higher than the glass transition point of the resin, and may be, for example, 90 to 260° C., preferably 100 to 240° C., depending on the kind of the resin.

The kneaded product may be molded by, for example, die molding, injection molding, extrusion molding, hollow molding, or foam molding. The kneaded product may be spun into a fibrous shape, mixed with the above-mentioned plant materials or the like, and molded into a mat shape or a board shape. The mixing may be performed by, for example, simultaneous deposition by air-laying.

As a machine for molding the kneaded product, one or more machines may be selected and used from the group consisting of, for example, injection molding machine, a blow molding machine, a hollow molding machine, a blow molding machine, a compression molding machine, an extrusion molding machine, a vacuum molding machine, and a pressure molding machine.

The molding discussed above may be performed following the kneading, or by first cooling the kneaded product, chipping the cooled product in a crusher or the like, and then introducing the resulting chips in a molding machine, such as an extrusion molding machine or an injection molding machine. It is noted that the molding is not an essential requirement of the present invention.

(Definitions, Method of Measuring, and Others)
(Average Fiber Diameter)

The average fiber diameters of the fine fibers (microfiber cellulose and cellulose nanofibers) are measured in the following means.

First, 100 ml of an aqueous dispersion of fine fibers having a solid concentration of 0.01 to 0.1 mass % is filtered through a TEFLON (registered trademark) membrane filter, and subjected to solvent substitution once with 100 ml of ethanol and three times with 20 ml of t-butanol. Then the resulting mass is lyophilized and coated with osmium to obtain a sample. An electron microscopic SEM image of this sample is observed at a magnification of 3000 to 30000 folds, depending on the width of the constituent fibers. Specifically, two diagonal lines are drawn on the observation image, and three arbitrary straight lines passing the intersection of the diagonals are drawn. Then, the widths of a total of 100 fibers crossing these three straight lines are visually measured. The median diameter of the measured values is taken as the average fiber diameter.

The average fiber diameter of pulp is measured in the following means.

First, 100 ml of an aqueous dispersion of pulp having a solid concentration of 0.01 to 0.1 mass % is filtered through a TEFLON (registered trademark) membrane filter, and subjected to solvent substitution once with 100 ml of ethanol and three times with 20 ml of t-butanol. Then the resulting mass is lyophilized and coated with osmium to obtain a sample. An electron microscopic SEM image of this sample is observed at a magnification of 100 to 1000 folds, depending on the width of the constituent fibers. Specifically, two diagonal lines are drawn on the observation image, and three arbitrary straight lines passing the intersection of the diagonals are drawn. Then, the widths of a total of 100 fibers crossing these three straight lines are visually measured. The median diameter of the measured values is taken as the average fiber diameter.

(Aspect Ratio)

An aspect ratio is a value obtained by dividing the average fiber length by the average fiber width. A larger aspect ratio causes a larger number of locations to be caught, which enhances the reinforcing effect but, on the other hand, is assumed to result in lower ductility of the resin.

(Water Retention Degree)

The water retention is a value determined in accordance with JAPAN TAPPI No. 26 (2000).

(Fiber Analysis)

The percentage of the fibers having a fiber length of 0.2 mm or shorter, the percentage of fibrillation, and the average fiber length are measured using a fiber analyzer, FS5, manufactured by Valmet K.K.

(Degree of Crystallinity)

The degree of crystallinity is a value determined in accordance with JIS K 0131 (1996).

(Viscosity)

The pulp viscosity is a value determined in accordance with TAPPI T 230.

(B-Type Viscosity)

The B-type viscosity of the dispersion (1% solid concentration) is a value determined in accordance with JIS-Z8803 (2011) "Methods for viscosity measurement of liquid". A B-type viscosity is a resistant torque in stirring a dispersion, and a higher value indicates more energy required for stirring.

(Freeness)

The freeness is a value determined in accordance with JIS P8121-2 (2012).

(Degree of Substitution)

The degree of substitution with the carbamate groups is determined by Kjeldahl method for nitrogen determination.

EXAMPLES

Next, Examples of the present invention will be discussed.

Into 365 g of an aqueous dispersion of microfiber cellulose (MFC) having a solid concentration of 2.75 wt %, 6 g of urea and 79 g of polypropylene powder (PP) were added and dried under heating at 105° C. to obtain a fibrous cellulose mixture. The moisture content of the obtained fibrous cellulose mixture was lower than 10%. The fibrous cellulose mixture was heat treated at 140° C. for 4 hours to carbamate (carbamate modification) the microfiber cellulose.

Ninety-five grams of this carbamated mixture and 5 g of maleic anhydride-modified polypropylene (MAPP) were kneaded at 180° C. in a twin-screw kneader at 200 rpm to obtain a fibrous cellulose composite resin. The obtained fibrous cellulose composite resin was cut in a pelleter into a cylinder of 2 mm long and 2 mm in diameter, and injection molded at 180° C. into a cuboid test piece (59 mm long, 9.6 mm wide, and 3.8 mm thick) (Test Example 1). As shown in Table 1, other tests were also conducted with various mixing ratios of the mixtures and the like (other Test Examples). The results of the bending test are shown in Table 1.

In the bending test, flexural modulus was first determined in accordance with JIS K7171: 2008. In the table, with reference to the flexural modulus of the resin per se being 1, a flexural modulus (multiple) of the composite resin of 1.3 times or more was indicated by ○ (circle), while a flexural modulus of less than 1.3 times was indicated by × (cross mark).

|  | Mixing ratio Fiber:Urea:MAPP:PP (Ratio by mass) | Fiber | | | | Heating treatment ° C. | Bending test |
|---|---|---|---|---|---|---|---|
|  |  | Kind | Average fiber length μm | Percentage of fibrillation % | Degree of carbamate substitution | | |
| Test Example 1 | 10:4:5:81 | MFC | 1.60 | 2.49 | 0.05-0.5 | 140 | ○ |
| Test Example 2 | 10:6:5:79 | MFC | 1.60 | 2.49 | 0.05-0.5 | 140 | ○ |
| Test Example 3 | 10:8:5:77 | MFC | 1.60 | 2.49 | 0.05-0.5 | 140 | ○ |
| Test Example 4 | 10:10:5:75 | MFC | 1.60 | 2.49 | 0.05-0.5 | 140 | ○ |
| Test Example 5 | 10:4:1:85 | MFC | 0.16 | 10.17 | 0.05-0.5 | 140 | ○ |
| Test Example 6 | 10:4:3:83 | MFC | 0.16 | 10.17 | 0.05-0.5 | 140 | ○ |
| Test Example 7 | 10:6:5:79 | CNF | — | — | 0.05-0.5 | 140 | × |
| Test Example 8 | 10:6:5:79 | MFC | 2.10 | 0.50 | 0.05-0.5 | 140 | × |
| Test Example 9 | 10:6:0:84 | MFC | 0.16 | 2.49 | 0.05-0.5 | 140 | × |
| Test Example 10 | 10:0:5:85 | MFC | 0.16 | 2.49 | 0.05-0.5 | 140 | × |
| Test Example 11 | 10:0:0:90 | MFC | 0.16 | 2.49 | 0.05-0.5 | 140 | × |
| Test Example 12 | 10:6:5:79 | MFC | 0.16 | 2.49 | <0.05 | 90 | × |

INDUSTRIAL APPLICABILITY

The present invention is applicable as a fibrous cellulose composite resin, a method for producing the same, and a reinforcing material for resins. For example, the fibrous cellulose composite resin may be applicable as interior materials, exterior materials, structural materials, and the like of transport equipment, such as vehicles, trains, vessels, and airplanes; housings, casings, structural materials, internal components, and the like of electronic appliances, such as personal computers, televisions, telephones, and clocks; casings, structural materials, internal components, and the like of mobile communication equipment, such as mobile phones; housings, casings, structural materials, internal components, and the like of mobile music reproduction equipment, video reproduction equipment, printing equipment, copying equipment, sports goods, office equipment, toys, sports goods, and the like; interior materials, exterior materials, structural materials, and the like of buildings, furniture, and the like; business equipment, such as stationaries, and the like; and packages, containers like trays, protection members, partition members, and various others.

The invention claimed is:

1. A fibrous cellulose composite resin comprising:
   fibrous cellulose, a resin, and an acid-modified resin,
   wherein part or all of the fibrous cellulose is microfiber cellulose,
   the microfiber cellulose has an average fiber width of 0.1 μm or larger, an average fiber length of 0.02 to 2.0 mm, wherein 20% or more of the microfiber cellulose has a fiber length of 0.2 mm or shorter, and a percentage of fibrillation of 1.0% to 30.0%, part or all of its hydroxyl groups being substituted with carbamate groups, and
   part or all of the carbamate groups are ionically bonded to acidic groups of the acid-modified resin.

2. The fibrous cellulose composite resin according to claim 1, wherein a degree of substitution of the hydroxyl groups by the carbamate groups is 0.05 to 0.5.

3. The fibrous cellulose composite resin according to claim 2, wherein the acid-modified resin is a maleic anhydride-modified resin.

4. The fibrous cellulose composite resin according to claim 1, wherein the acid-modified resin is a maleic anhydride-modified resin.

5. The fibrous cellulose composite resin according to claim 4, wherein the composite resin comprises 1 to 200 parts by mass of the maleic anhydride-modified resin based on 100 parts by mass of the microfiber cellulose.

6. The fibrous cellulose composite resin according to claim 1, wherein a difference between a solubility parameter of the microfiber cellulose and a solubility parameter of the resin ranges from 10 to 0.1.

7. A method for producing a fibrous cellulose composite resin, comprising:
defibrating a cellulose raw material into microfiber cellulose and kneading the microfiber cellulose with a resin to obtain the fibrous cellulose composite resin, wherein the defibrating is performed so that the microfiber cellulose has an average fiber width of 0.1 μm or larger, an average fiber length of 0.02 to 2.0 mm, wherein 20% or more of the microfiber cellulose has a fiber length of 0.2 mm or shorter, and a percentage of fibrillation of 1.0% to 30.0%, the method further comprising:
prior to or following the defibrating, modifying the cellulose fibers by substituting part or all of hydroxyl groups of the cellulose fibers with carbamate groups, and
prior to or during the kneading, adding an acid-modified resin and a dispersant, wherein the acid-modified resin has a molecular weight that is higher than a molecular weight of the dispersant.

8. The method for producing a fibrous cellulose composite resin according to claim 7, wherein the modifying is performed prior to the defibrating.

9. A reinforcing material for thermoplastic or thermosetting resins, comprising:
fibrous cellulose and an acid-modified resin,
wherein part or all of the fibrous cellulose is microfiber cellulose,
the microfiber cellulose has an average fiber width of 0.1 μm or larger, an average fiber length of 0.02 to 2.0 mm, wherein 20% or more of the microfiber cellulose has a fiber length of 0.2 mm or shorter, and a percentage of fibrillation of 1.0% to 30.0%, part or all of its hydroxyl groups being substituted with carbamate groups, and
part or all of the carbamate groups are ionically bonded to acidic groups of the acid-modified resin.

* * * * *